2,701,247

MONO- AND BIS-(TERTIARY AMINOALKYL-AMINO)-p-BENZOQUINONES

Chester J. Cavallito, Ravena, N. Y., assignor to Sterling Drug Inc., New York, N. Y., a corporation of Delaware No Drawing. Original application October 5, 1949, Serial No. 119,760. Divided and this application November 6, 1951, Serial No. 261,575

10 Claims. (Cl. 260—294.7)

This invention relates to a particular group of (tertiary amino)alkylamino-p-benzoquinones and acid addition salts thereof, and to processes for their production.

In addition to being useful as intermediates for the preparation of highly active curarimimetic agents by conversion to quaternary ammonium compounds as described hereinafter, the novel (tertiary amino)alkyl-amino-p-benzoquinones of my invention are valuable, per se and in the form of their simple addition salts with acids, as pharmaceutical agents. In particular, these amines exhibit a moderate curarimimetic activity which adapts them to use in special cases where an agent of such activity is desired. The novel amines of my invention have the general formula

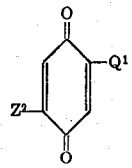

where $Q^1$ is a member of the group of (tertiary amino)-alkylamino radicals having the formula

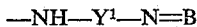

$$—NH—Y^1—N=B$$

where $Y^1$ is a lower alkylene bridge interposing 3–5 carbon atoms between the two nitrogen atoms connected by the bridge, and $—N=B$ is a tertiary amino radical selected from the group consisting of di-(lower alkyl)-amino radicals, 1-piperidyl radicals, and 1-pyrrolidyl radicals; and $Z^2$ is a member of the group consisting of hydrogen, (lower alkyl)amino, di-(lower alkyl)amino, and (tertiary amino)alkylamino radicals having the formula $—NH—Y^1—N=B$. By the term "lower alkyl" as applied to the definitions of $—N=B$ and $Z^2$, I mean to include alkyl radicals containing 1–5 carbon atoms. Examples of the members of this group of amines include:

(a) 2,5 - bis - (3 - diethylaminopropylamino) - p - benzoquinone;
(b) 2 - [3 - (1 - piperidyl)propylamino] - p - benzoquinone;
(c) 2 - [3 - (2 - methyl - 1 - piperidyl)propylamino] - p-benzoquinone;
(d) 2 - [3 - (1 - pyrrolidyl)propylamino] - p - benzoquinone;
(e) 2,5 - bis - [3 - (1 - piperidyl)propylamino] - p - benzoquinone;
(f) 2 - (4 - diethylaminobutylamino) - p - benzoquinone;
(g) 2 - (4 - diethylaminobutylamino) - 5 - methylamino - p-benzoquinone;
(h) 2 - (4 - diethylaminobutylamino) - 5 -dimethyl- amino-p-benzoquinone;
(i) 2,5 - bis -(4 - diethylaminobutylamino) - p - benzoquinone;
(j) 2,5 - bis - (5 - diethylaminoamylamino) - p - benzoquinone; and
(k) 2,5 - bis - [5 - (1 - piperidyl)amylamino] - p - benzoquinone.

All of these bases form salts with organic and inorganic acids having the formula H—An, where An is a non-toxic anion. These salts, in which form the amines are most advantageously employed when the use of aqueous solutions is contemplated, have the general formula

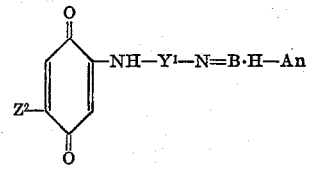

When $Z^2$ is a (tertiary amino)alkylamino group, the amines react with two equivalents of the acid. Among the more useful salts there can be mentioned those with hydrochloric acid, hydrobromic acid, sulfuric acid, tartaric acid, nitric acid, citric acid, etc.

My invention comprises: interacting a p-benzoquinone with one or two molecular equivalents of a primary N-[(tertiary amino)alkyl]-amine under conditions of mild oxidation to yield, respectively, a 2-mono- or a 2,5-bis-[N-(tertiary amino)alkylamino]-p-benzoquinone; and, if desired, converting the reaction product thus obtained to an acid addition salt.

The new class of quaternary ammonium compounds disclosed and claimed in my parent copending U. S. patent application Ser. No. 119,760, filed October 5, 1949, which includes compounds formed by quaternizing the novel amines disclosed and claimed in the instant application, has the general formula

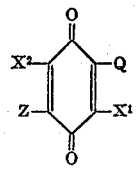

where Q is a member of the group of iminoalkyl-(quaternary ammonium) radicals having the formula

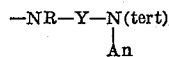

where Y is a lower alkylene bridge interposing 2–5 carbon atoms between the two nitrogen atoms connected by the bridge, N(tert) is a tertiary amine radical, R is hydrogen or methyl, and An is a non-toxic anion; Z is a member of the group consisting of hydrogen, alkyl-amino radicals, dialkylamino radicals, and iminoalkyl-(quaternary ammonium) radicals having the formula

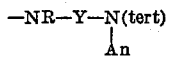

and $X^1$ and $X^2$ are each hydrogen or, when Z is an iminoalkyl-(quaternary ammonium) radical, $X^1$ and $X^2$ are each hydrogen or a middle halogen, i. e. chlorine or bromine. The iminoalkyl-(quaternary ammonium) radicals Q and Z can be the same or different, as desired. Thus, all of my new quaternary compounds contain the parent structure

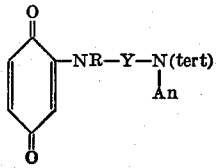

or can be considered as derived therefrom by introduction of the above specified substituents in one or more of the 3, 5, and 6 positions of the parent structure, such substituents including particularly a second iminoalkyl-(quaternary ammonium) radical in the 5-position.

Represented ionically, these quaternary ammonium compounds have the structure

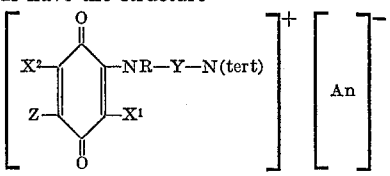

The quaternary ammonium grouping, [—N(tert)]+, makes its chief contribution to the physiological activity of my new compounds by virtue of the electrostatic field set up at the site of the quaternary nitrogen. Since this contribution is inherent in the quaternary ammonium grouping, the structure of the tertiary amine radical N(tert) can be varied very widely. Thus, this radical can be either cyclic or acyclic in structure and the groups attached to the nitrogen can be chosen from a great number of hydrocarbon or substituted hydrocarbon radicals. For practical reasons, however, I prefer to limit the scope of the radical N(tert) to those cyclic and acyclic tertiary amine radicals containing not more than 20 carbon atoms. Moreover, from this restricted group of radicals, I prefer to exclude aromatic amine radicals which have an aryl radical attached directly to the amino nitrogen atom, since the low basicity of the arylamines leads to preparative difficulties and resultant lowered yields of products.

The iminoalkyl-(quaternary ammonium) radical,

—NR—Y—N(tert)
          |
          An can be represented in a preferred scope by the following structural formulation, wherein N(tert) is represented in a more specific fashion as NR¹R²R³:

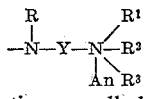

where R¹ is an aliphatic or aralkyl radical; and R² and R³, when taken separately, represent monovalent organic radicals other than aryl radicals and preferably containing 1–10 carbon atoms each, or R² and R³ taken together with the quaternary nitrogen atom form a 5–6 membered saturated heterocyclic ring which may additionally contain oxygen or sulfur.

The aliphatic or aralkyl radicals represented by R¹ are, for example, alkyl radicals, alkenyl radicals, and benzyl radicals. The preferred radicals of this type are alkyl and alkenyl radicals containing 1–7 carbon atoms, such as methyl, ethyl, n-butyl, n-heptyl, allyl, methallyl, etc. and (monocyclic aryl)methyl radicals containing 7–10 carbon atoms, and which may carry inert substituents on the ring such as alkyl, alkoxy, or halogen, e. g. benzyl, 2,4,6-trimethoxybenzyl, p-methoxybenzyl, p-chlorobenzyl, methylbenzyl, etc.

The monovalent organic radicals represented by R² and R³ include saturated and unsaturated aliphatic and cycloaliphatic radicals, and aralkyl radicals. As examples of these monovalent radicals, there are included alkyl radicals such as methyl, ethyl, n-propyl, isopropyl, n-butyl, isohexyl, etc.; alkenyl radicals such as allyl, methallyl, etc.; aralkyl radicals such as benzyl, phenethyl, p-chlorobenzyl, p-methoxybenzyl, o-ethoxybenzyl, etc.; cycloalkyl radicals such as cyclohexyl, cyclopentyl, etc.; and cycloalkenyl radicals such as 2-cyclohexenyl, 2-cyclopentenyl, etc. The preferred monovalent radicals are lower aliphatic radicals containing 1–7 carbon atoms, such as lower alkyl and lower alkenyl radicals, and lower aralkyl radicals containing 7–10 carbon atoms, such as (monocyclic aryl) methyl radicals, e. g. benzyl, halobenzyl, and alkoxybenzyl radicals.

When R² and R³ are taken together with the nitrogen atom to form a saturated 5–6 membered heterocyclic ring, the quaternary ammonium radical —NR¹R²R³
   |
   An includes cyclic quaternary ammonium radicals as:

(a) Quaternary piperidinium radicals, for example

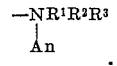

and

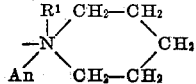

(b) Quaternary morpholinium radicals, for example

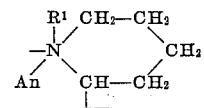

(c) Quaternary pyrrolidinium radicals, for example

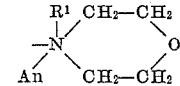

and (d) Quaternary thiamorpholinium radicals, for example

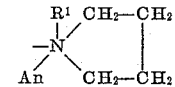

It will be appreciated that the unattached valence bond on the nitrogen represented in the structures for the above radicals is, in the formula for a complete molecule, attached to one of the valence bonds of the divalent alkylene radical Y.

The divalent lower alkylene bridge represented by the group Y in my compounds interposes 2–5 carbon atoms between the two nitrogen atoms connected by the bridge and includes alpha, omega-alkylene radicals such as 1,2-ethylene, —CH₂—CH₂—; 1,3-propylene
—CH₂—CH₂—CH₂—; 1,4-butylene
—CH₂—CH₂—CH₂—CH₂—; and 1,5-amylene
—CH₂—(CH₂)₃—CH₂—

Radicals of the foregoing type wherein one or more carbon atoms of the bridge bear one or more methyl or ethyl groups as substituents, as represented for example by the 1,2-propylene radical, —CH(CH₃)—CH₂—, also fall within the scope of my invention. The group Y preferably contains a total of 2–7 carbon atoms.

The preparation of my new quaternary compounds is conveniently carried out in many instances by direct quaternization of the appropriate N-[(tertiary amino)-alkyl]amino-p-benzoquinones. Thus, for example, p-benzoquinones containing the (tertiary amino)alkylamino grouping —NR—Y—NR²R³ attached to the 2-position, or 2- and 5-positions, of the p-benzoquinone nucleus are quaternized by treatment with an alkylating agent which is an ester of an aliphatic or araliphatic alcohol having the formula R¹—OH with a strong organic or inorganic acid, said ester having the formula R¹An¹, where An¹ is the non-toxic anion of the strong organic or inorganic acid. A preferred group of these alkylating agents comprises esters of primary aliphatic and araliphatic alcohols with strong organic or inorganic acids. These agents include for example, methyl iodide, methyl bromide, methyl p-toluenesulfonate, dimethyl sulfate, ethyl iodide, ethyl p-toluenesulfonate, ethyl chloroacetate, n-propyl iodide, allyl chloride, allyl bromide, n-hexyl bromide, benzyl chloride, benzyl bromide, p-methoxybenzyl chloride, p-chlorobenzyl chloride, etc. The esters of methyl, ethyl, allyl, and benzyl alcohols are especially useful. The general quaternization reaction proceeds according to the following equation:

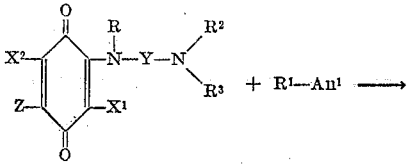 + R¹—An¹ ⟶

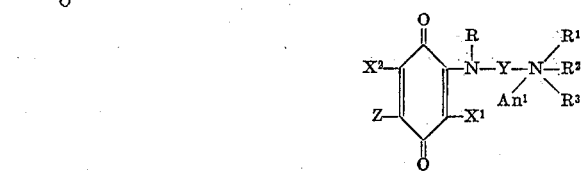

It will be appreciated that when Z represents an iminoalkyl-(quaternary ammonium) radical, the original amine employed for obtaining the above starting material has the formula

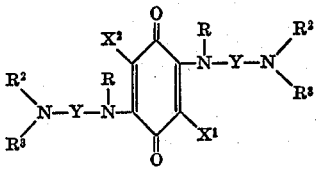

and the two moles of the ester, $R^1$—$An^1$, which are required for the complete quaternization reaction can be added more conveniently in a single step. The quaternization of the amines is simply and conveniently carried out by mixing the selected amine with one or two molecular equivalents of the ester, $R^1$—$An^1$, as required, plus an excess of the ester if desired. The reaction of the ester with the amine can be facilitated by heating the reaction mixture. This is especially advantageous when employing an araliphatic ester such as benzyl chloride as the quaternizing agent, but may be unnecessary or undesirable, for example, in the case of a low-boiling lower alkyl ester where the reaction proceeds with sufficient rapidity at room temperature.

In those instances where the anion, An, is derived from a relatively weak acid such as citric acid or tartaric acid, the direct addition of the ester $R^1$—An to the tertiary amine does not readily occur due to the properties of the particular ester employed. In such cases it is possible by use of metathetical reactions to replace the anion $An^1$ of one quaternary ammonium salt by a different anion without reconversion to the tertiary amine. This is usually effected by treatment of an aqueous solution of the quaternary ammonium salt containing the anion $An^1$ with silver oxide (hydroxide). The silver salt Ag—$An^1$ is precipitated, leaving in solution the quaternary ammonium hydroxide. It is prerequisite, of course, that the salt Ag—$An^1$ be insoluble in water. The quaternary ammonium hydroxide may then be neutralized with the appropriate acid H—An, which can be either a strong or a weak organic or inorganic acid, to give any desired salt.

The new amines of my present invention can be prepared conveniently by the following procedures. Those amines having one (tertiary amino)alkylamino group, NH—$Y^1$—N=B, are obtained by interacting a p-benzoquinone having the formula

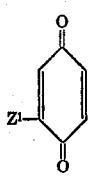

where $Z^1$ is hydrogen, (lower alkyl)amino, or di(lower alkyl)amino, with one molecular equivalent of a primary N-[(tertiary amino)alkyl]-amine under conditions of mild oxidation, such as obtained by passing air or, preferably, oxygen through the reaction mixture during the reaction period, which generally requires several hours and is conveniently carried out overnight, i. e. for 6–20 hours, or longer. The reaction proceeds according to the following equation:

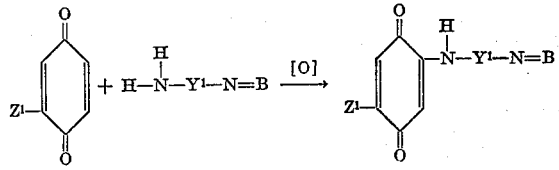

When $Z^1$ is hydrogen, a second (tertiary amino)alkylamino group can be introduced readily into the 5-position of the 2-[(tertiary amino)alkylamino]-p-benzoquinone by causing a second molecular equivalent of the alkylenediamine, $H_2N$—$Y^1$—N=B, to react. Thus,

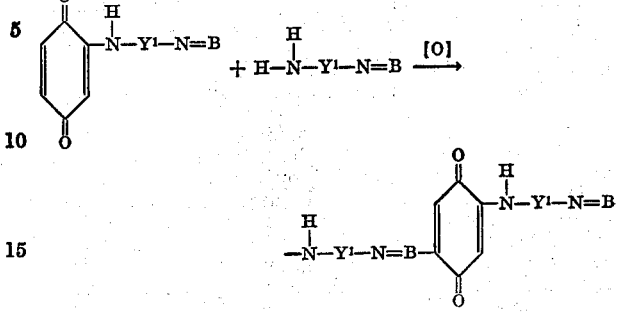

The 2-[(tertiary amino)alkylamino]-p-benzoquinones also react with primary and secondary alkylamines under conditions of mild oxidation to introduce a 5-alkylamino or 5-dialkylamino group, respectively, into the p-benzoquinone nucleus, as illustrated by the following equation:

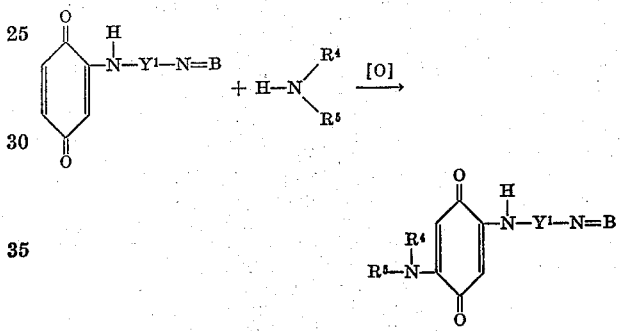

where $R^4$ is a lower alkyl radical containing 1–7 carbon atoms and $R^5$ is hydrogen or a lower alkyl radical containing 1–7 carbon atoms. In the preparation of 2-[(tertiary amino)alkylamino]-5-(mono- or di-alkyl)amino-p-benzoquinones, the introduction of the groups at the 2- and 5-positions of the p-benzoquinone nucleus can be carried out in alternative sequence. However, I prefer to introduce the 2-(tertiary amino)alkylamino group first, and then the 5-(alkyl- or di-alkyl)amino group, since in this sequence fewer isolation problems are encountered. The quaternization of these 2-[(tertiary amino)alkylamino]-5-(mono- or di-alkyl)amino-p-benzoquinones is illustrated by the following equation:

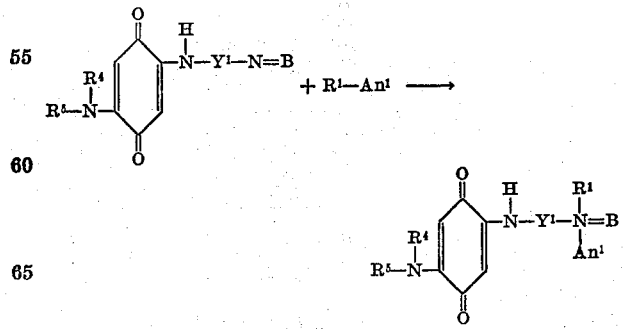

If it is desired that the (tertiary amino)alkylamino groups introduced at positions 2 and 5 of the p-benzoquinone nucleus as above-described be identical, the reaction can be carried out either in one operation by reacting p-benzoquinone with two molecular equivalents of the alkylenediamine or, less conveniently, in two steps, introducing first one (tertiary amino)alkylamino group and then the other. When, on the other hand, it is desired to introduce different (tertiary amino)alkylamino groups at positions 2 and 5, the reaction must of course be carried out in stepwise fashion, causing first one alkylenediamine to react and then the other.

The introduction of a single (tertiary amino)alkylamino group into the p-benzoquinone nucleus can be carried out by employing substantially one molecular equivalent of the alkylenediamine, $H_2N$—$Y^1$—$NR^2R^3$, per equivalent of the p-benzoquinone, or alternatively, the reaction can be carried out in concentrated solution so that the 2-(tertiary aminoalkylamino)-p-benzoquinone precipitates from the reaction medium as it is formed, in which case a considerable excess of the alkylenediamine can be employed to increase the speed of reaction without the disadvantage of producing an appreciable quantity of the 2,5-bis-(tertiary aminoalkylamino)-p-benzoquinone when the bis compound is an undesired by-product.

Instead of employing p-benzoquinone as such, hydroquinone can be employed as the starting material, the hydroquinone being converted by the oxidizing atmosphere (furnished, for example, by use of a mild oxidizing agent such as hydrogen peroxide, oxygen, air, a quinone, etc.) of the reaction mixture to p-benzoquinone. However, when hydroquinone is employed, the reaction time required is increased, and therefore I prefer to use p-benzoquinone itself.

The use of oxygen in maintaining the oxidizing atmosphere in the reaction mixture is generally to be preferred over use of air, since the reaction proceeds more rapidly when oxygen is employed. However, the use of air offers a useful alternative when oxygen is not available. In the preparation of mono-(tertiary amino)alkylamino-p-benzoquinones, it is convenient to employ an excess of the p-benzoquinone amounting to about one molecular equivalent or more in the reaction to function as a mild oxidizing agent, in which case the use of gaseous oxygen or air is not necessary. This procedure has the added advantage that the reaction time required is usually only about one-half to one hour, while when oxygen or air is used as the oxidizing agent the reaction time is usually at least several hours. The interaction of the p-benzoquinone with the alkylenediamine is advantageously carried out in a solvent, the choice of which can be made from a wide variety of organic solvents. I have found that dioxane, acetonitrile, and benzene, for example, are excellent solvents for use in my process and are somewhat more satisfactory in this regard than are water and alcohol.

My invention is illustrated by the following examples without, however, being limited thereto.

EXAMPLE 1

A. *2,5-bis-(3-diethylaminopropylamino)-p-benzoquinone*

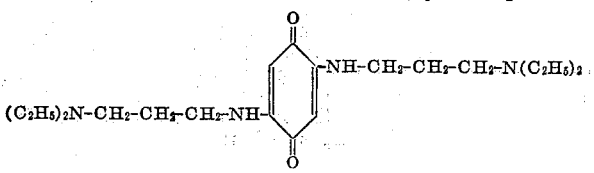

104 g. of N,N-diethyl-1,3-propanediamine was added to 44 g. benzoquinone in 500 ml. of dioxane, with provision for external cooling of the reaction mixture when necessary. Oxygen was bubbled through the solution for approximately 20 hours. The reaction mixture was then cooled in an ice-bath. A red crystalline precipitate formed and this was filtered off and recrystallized from hot ethanol. There was thus obtained, as a red crystalline compound, 35 g. of 2,5-bis-(3-diethylaminopropylamino)-p-benzoquinone, which melted at 122–124° C. A small additional crop of this product was obtained by concentration of the dioxane mother liquor.

*Analysis.*—Calculated: N, 15.37%; C, 65.89%; H, 9.96%. Found: N, 15.18%; C, 65.91%; H, 9.68%.

The compound formed a dihydrochloride which was obtained as a red powder which melted at 250–251° C. (dec.).

B. *2,5-bis-(3-diethylaminopropylamino)-p-benzoquinone bis-(benzyl chloride)*

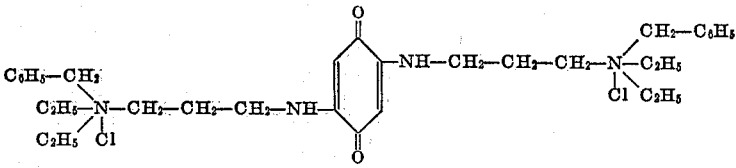

35 g. of 2,5-bis-(3-diethylaminopropylamino)-p-benzoquinone was dissolved in 500 ml. of 95% ethanol, and 60 g. of benzyl chloride was added to the solution. The mixture was refluxed for four hours and was then cooled. An equal volume of ether was added to the reaction mixture, thus precipitating a red oil which crystallized on standing. The precipitate was collected on a filter, and re-precipitated with ether from solution in 95% ethanol twice more. The product was dried in an oven at 80° C. There was thus obtained 51 g. of 2,5-bis-(3-diethylaminopropylamino)-p-benzoquinone bis-(benzyl chloride) as an orange-red solid which melted at 191–195° C. The melting point varied somewhat with the rate of heating. The compound was highly water-soluble.

*Analysis.*—Calculated: N, 9.08%; Cl, 11.48%. Found: N, 9.28%; Cl, 11.68%.

C. *2,5-bis-(3-diethylaminopropylamino)-p-benzoquinone bis-methobromide*

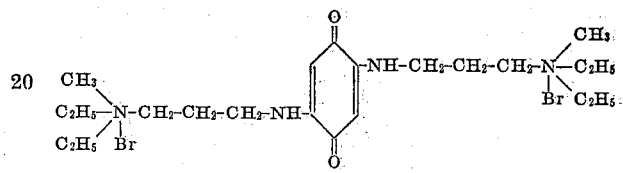

A solution of 5 g. of 2,5-bis-(3-diethylaminopropylamino)-p-benzoquinone in 100 ml. of ethanol was mixed at about 25° C. with methyl bromide. After the mixture had stood for about 2 hours, a precipitate formed (in another run, the precipitate formed after addition of ether to the reaction mixture). The precipitate was collected, washed with dioxane, and dried in an oven at 80° C. There was thus obtained 7.7 g. of 2,5-bis-(3-diethylaminopropylamino)-p-benzoquinone bis-methobromide as an orange powder which melted at 225° C.

*Analysis.*—Calculated: N, 10.10; Br. 28.82%. Found: N, 10.38%; Br, 28.95%.

When the quaternization was repeated using a 1:1 mixture of ethanol and dioxane as the solvent, the desired bis-methobromide was obtained in substantially the same yield.

D. Alternatively, the bis-methobromide described in part C above is prepared by interacting ethyl bromide with 2,5-bis-(3-ethylmethylaminopropylamino)-p-benzoquinone,

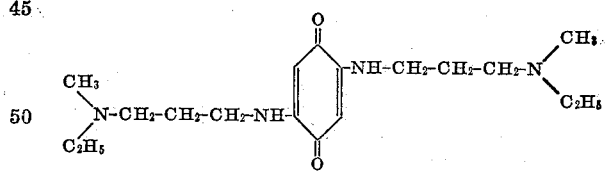

which is obtained by interaction of N-ethyl-N-methyl-1,3-propanediamine and p-benzoquinone in the presence of oxygen by a procedure similar to that described in part A above.

EXAMPLE 2

A. *2-(3-dimethylaminopropylamino)-p-benzoquinone*

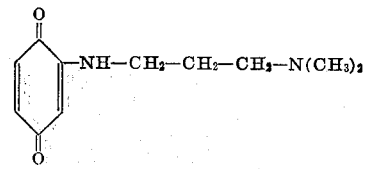

To a solution of 5.4 g. of p-benzoquinone in 50 ml. of dioxane there was added 10.2 g. of N,N-dimethyl-1,3-propylenediamine and the oxygen was bubbled through the solution for four hours. The reaction mixture was then concentrated under reduced pressure and water was added to the residue. The solid which precipitated was collected on a filter and recrystallized from aqueous ethanol. There was obtained in this manner 6.8 g. of 2-(3-dimethylaminopropylamino)-p-benzoquinone, which melted at 159–160° C.

*Analysis.*—Calculated: N, 13.44%; C, 63.40%; H, 7.74%. Found: N, 13.29%; C, 63.18%; H, 8.05%.

B. *Quaternary salts of 2-(3-dimethylaminopropylamino)-p-benzoquinone*

2-(3-dimethylaminopropylamino)-p-benzoquinone reacts with benzyl chloride and with p-chlorobenzyl chloride to yield, respectively, 2-(3-dimethylaminopropylamino)-p-benzoquinone benzyl chloride, which has the formula and 2-(3-dimethylaminopropylamino)-p-benzoquinone p-chlorobenzyl chloride, which has the formula

EXAMPLE 3

A. *2-[3-(1-piperidyl)propylamino]-p-benzoquinone*

To a solution of 12 g. p-benzoquinone (excess p-benzoquinone employed as oxidizing agent) in 100 ml. of dioxane there was added 7.5 g. of 1-(3-aminopropyl)piperidine and the solution was stirred for one hour. The reaction mixture was then cooled and the crystals which separated from solution were collected on a filter and recrystallized from hot ethanol-dioxane solution. There was thus obtained 5 g. of 2-[3-(1-piperidyl)propylamino]-p-benzoquinone in the form of red crystals, which melted at 200–201° C. (dec.).

*Analysis.*—Calculated: N, 11.29; C, 67.71%; H, 8.12%. Found: N, 10.97%; C, 67.38%; H, 8.38%.

The compound formed a hydrochloride which was obtained as a light brown powder which melted at 251–255° C.

B. *Quaternary salts of 2-[3-(1-piperidyl)propylamino]-p-benzoquinone*

When 2-[3-(1-piperidyl)propylamino]-p-benzoquinone was quaternized by treatment with methyl bromide, using a procedure similar to that described in Example 1C, there was obtained 2-[3-(1-piperidyl)propylamino]-p-benzoquinone methobromide, which melted at 255° C.

*Analysis.*—Calculated: N, 8.17%; Br, 23.28%. Found: N, 8.13%; Br, 23.70%.

The amine reacts with allyl bromide to yield 2-[3-(1-piperidyl)propylamino]-p-benzoquinone allyl bromide,

EXAMPLE 4

*2-[3-(1-pyrrolidyl)propylamino]-p-benzoquinone and quaternary salts thereof*

When 7.3 g. of 1-(3-aminopropyl)pyrrolidine is substituted for the 7.5 g. of 1-(3-aminopropyl)piperidine in the procedure described in part A of Example 3, there is obtained as the product of the reaction 2-[3-(1-pyrrolidyl)-propylamino]-p-benzoquinone, which has the formula and which reacts with benzyl chloride and with allyl chloride to yield, respectively, 2-[3-(1-pyrrolidyl)propylamino]-p-benzoquinone benzyl chloride, which has the formula and 2-[3-(pyrrolidyl)propylamino]-p-benzoquinone allyl chloride, which has the formula

EXAMPLE 5

A. *2,5-bis-(3-dimethylaminopropylamino)-p-benzoquinone*

10.2 g. of N,N-dimethyl-1,3-propanediamine was added to 5.4 g. of p-benzoquinone in 100 ml. of dioxane and oxygen was bubbled through the solution for about thirty hours. The reaction mixture was then concentrated under reduced pressure and the residue thus obtained was stirred with ethanol and water. There was thus obtained from the mixture, as an insoluble product, 3 g. of 2,5-bis-(3-dimethylaminopropylamino)-p-benzoquinone in the form of red crystals which after washing with ether melted at M. P. 125–126° C.

*Analysis.*—Calculated: N, 18.17%; C, 62.35%; H, 9.15%. Found: N, 17.65%; C, 61.85%; H, 9.16%.

B. Quaternary salts of 2,5-bis-(3-dimethylaminopropylamino)-p-benzoquinone

Using a procedure similar to that described in Example 1B, 2,5-bis-(3-dimethylaminopropylamino)-p-benzoquinone was heated with an ethanolic solution of benzyl chloride, thus yielding 2,5-bis-(3-dimethylaminopropylamino)-benzoquinone bis-(benzyl chloride) as the dihydrate,

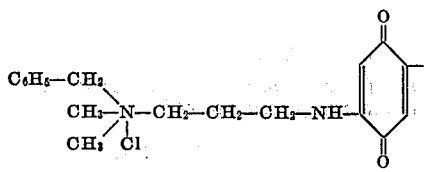 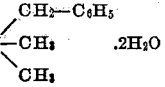

which had an indefinite melting point, ca. 205–225° C.
Analysis.—Calculated: N, 9.38%; Cl, 11.87%; $H_2O$, 6.03%. Found: N, 9.38%; Cl, 11.87%; $H_2O$ (Karl Fisher Method).

Two equivalents of methyl iodide react with the amine to yield 2,5-bis-(3-dimethylaminopropylamino)-p-benzoquinone bis-methiodide.

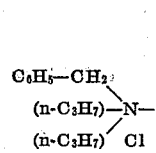

EXAMPLE 6

A. 2,5 - bis - (3 - di-n-propylaminopropylamino) - p-benzoquinone

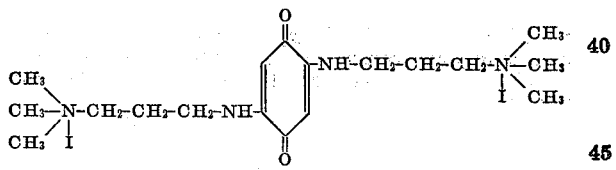

To a solution of 8.1 g. of p-benzoquinone in 150 ml. of dioxane there was added 23.7 g. of N,N-di-n-propyl-1,3-propanediamine, and oxygen was bubbled through the solution for forty hours. The reaction mixture was concentrated under reduced pressure and the residue was diluted with water. An oil which later solidified separated from the aqueous layer. This solid product was crystallized from hot petroleum ether. There was thus obtained 14.5 of 2,5-bis-(3-di-n-propylaminopropylamino)-p-benzoquinone in the form of red crystals which melted at 65–66° C.
Analysis.—Calculated: N, 13.34%. Found: N, 13.52%.

B. Quaternary salts of 2,5-bis-(3-di-n-propylaminopropylamino)-p-benzoquinone 2,5 - bis - (3 - di - n - propylaminopropylamino) - p-benzoquinone was quaternized by treatment with two molecular equivalents of benzyl chloride to yield 2,5-bis-(3-di-n-propylamino)-p-benzoquinone bis-(benzyl chloride),

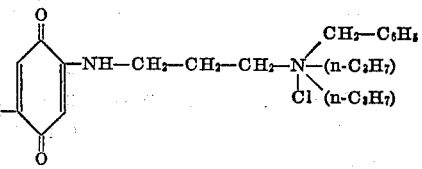

which had an indefinite melting point.

The amine reacted with two molecular equivalents of methyl bromide to yield 2,5-bis-(3-di-n-propylaminopropylamino)-p-benzoquinone bis-methobromide,

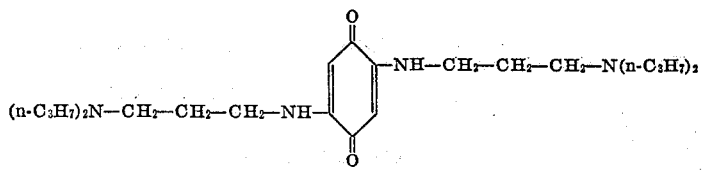

which melted at 202–204° C.

The amine reacts with two molecular equivalents of allyl chloride to yield 2,5-bis-(3-di-n-propylaminopropylamino)-p-benzoquinone bis-(allyl chloride),

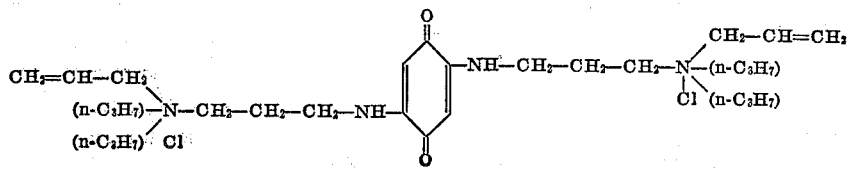

EXAMPLE 7

A. 2,5 - bis - [3 - (1 - piperidyl)propylamino] - p - benzoquinone

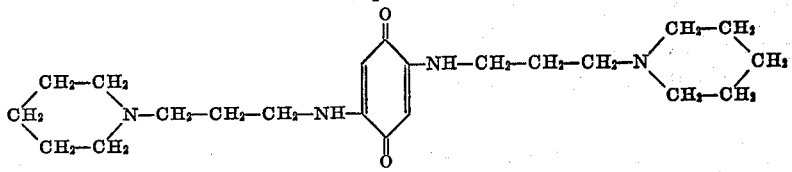

To 3.6 g. of 2-[3-(1-piperidyl)propylamino]-p-benzoquinone in 150 ml. of hot dioxane there was added 4 g. of 1-(3-aminopropyl)piperidine, and oxygen was passed into the hot solution for twenty hours. The reaction mixture was then cooled. The solid which separated from solution was collected on a filter and recrystallized from hot ethanol. There was thus obtained 3 g. of 2,5-bis-[3 - (1 - piperidyl)propylamino] - p - benzoquinone in the form of orange-red crystals which melted at 179–181° C.

*Analysis.*—Calculated: N, 14.42%; C, 68.00%; H, 9.34%. Found: N, 14.26%; C, 68.24%; H, 9.59%.

B. Quaternary salts of 2,5-bis-[3-(1-piperidyl)propylamino]-p-benzoquinone

2,5-bis-[3-(1-piperidyl)propylamino]-p - benzoquinone was quaternized by treatment with methyl bromide to yield 2,5 - bis-[3-(1-piperidyl)propylamino]-p-benzoquinone bis-methobromide,

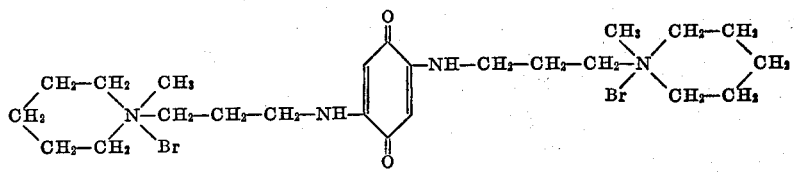

which melted at 253° C. (dec.).

*Analysis.*—Calculated: N, 9.68%; Br, 27.60%. Found: N, 9.63%; Br, 27,35%.

The amine reacts with two molecular equivalents of benzyl chloride to yield 2,5-bis-[3-(1-piperidyl)propylamino]-p-benzoquinone bis-(benzyl chloride),

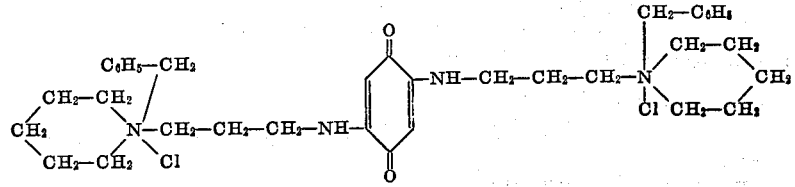

EXAMPLE 8

A. 2-(4-diethylaminobutylamino)-p-benzoquinone

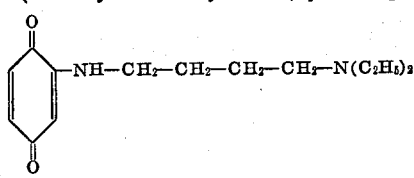

(1) To 8.7 g. of p-benzoquinone in 100 ml. of dioxane there was added 23 g. (one equivalent plus an excess) of N,N-diethyl-1,4-butanediamine and oxygen was passed into the reaction mixture for about twenty hours. There was obtained a crystalline precipitate which was collected on a filter. The mother liquors were concentrated to yield a second crop of the product. The combined crops of product were recrystallized from an ethanol-water mixture. There was obtained in this manner 8.8 g. of 2 - (4 - diethylaminobutylamino)-p-benzoquinone, which melted at 123–125° C.

*Analysis.*—Calculated: N, 11.19%; C, 67.16; H, 8.86. Found: N, 11.23%; C, 67,24; H, 9.08.

(2) When the preparation described in A (1) above was repeated, using substantially one equivalent of the alkylenediamine instead of an excess, the yield of 2-(4-diethylaminobutylamino)-p-benzoquinone obtained was only slightly less than that obtained in A (1).

B. Quaternary salts of 2-(4-diethylaminobutylamino)-p-benzoquinone

2-(4-diethylaminobutylamino) - p - benzoquinone was quaternized by treatment with one molecular equivalent of methyl bromide to yield 2-(4-diethylaminobutylamino)-p-benzoquinone methobromide,

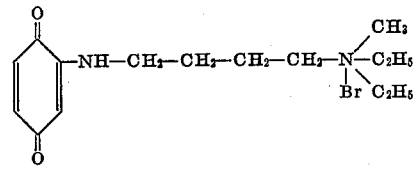

which melted at 146–148° C.

The amine reacts with benzyl chloride to yield 2-(4-diethylaminobutylamino)-p-benzoquinone benzyl chloride,

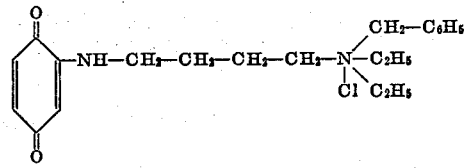

EXAMPLE 9

A. 2-(4-diethylaminobutylamino-5-methylamino-p-benzoquinone

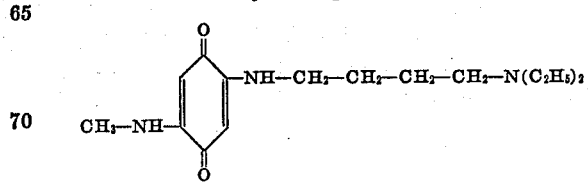

3 g. of 2-(4-diethylaminobutylamino)-p-benzoquinone was dissolved in 100 ml. of dioxane, and methylamine and oxygen were bubbled simultaneously into the solution for two hours. The solution was concentrated under reduced pressure and the residue was dissolved in benzene. The benzene solution was dried over sodium sulfate, filtered, and petroleum ether was added to the solution, thereby precipitating 1 g. of 2-(4-diethylaminobutylamino)-5-methylamino-p-benzoquinone, a yellow solid which melted at 103–106° C.

*Analysis.*—Calculated: C, 64.48%; H, 9.02%. Found: C, 64.28%; H, 9.04%.

B. Quaternary salts of 2-(4-diethylaminobutylamino)-5-methylamino-p-benzoquinone 2 - (4-diethylaminobutylamino)-5-methylamino-p-benzoquinone reacts with benzyl chloride and with methyl sulfate to yield, respectively, 2-(4-diethylaminobutylamino)-5-methylamino-p-benzoquinone benzyl chloride, which has the formula

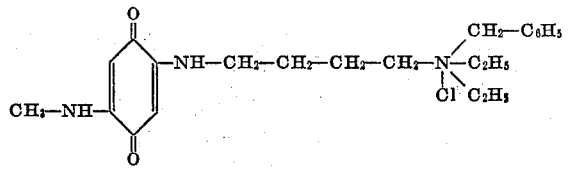

and 2 - (4 - diethylaminobutylamino)-5-methylamino-p-benzoquinone methosulfate, which has the formula

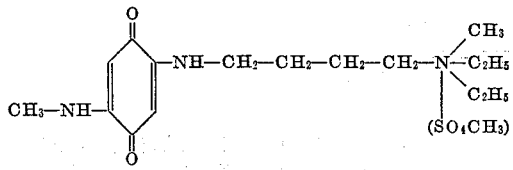

EXAMPLE 10

2-(4-diethylaminobutylamino)-5-dimethylamino-p-benzoquinone and quaternary salts thereof

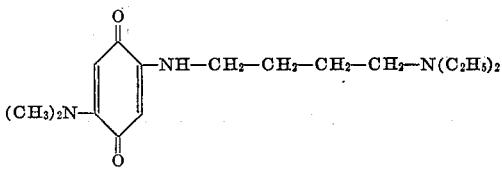

By substituting dimethylamine for the methylamine employed in Example 9A, there is obtained as the product of the reaction 2-(4-diethylaminobutylamino)-5-dimethylamino-p-benzoquinone, which reacts with allyl bromide and with methyl p-toluenesulfonate to yield, respectively, 2 - (4-diethylaminobutylamino)-5-dimethyl-amino-p-benzoquinone allyl bromide, which has the formula

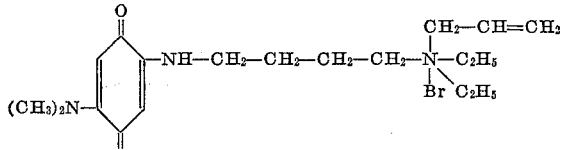

and 2 - (4-diethylaminobutylamino)-5-dimethylamino-p-benzoquinone methyl p-toluenesulfonate, which has the formula

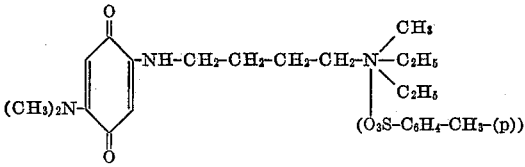

EXAMPLE 11

A. 2,5-bis-(4-diethylaminobutylamino)-p-benzoquinone

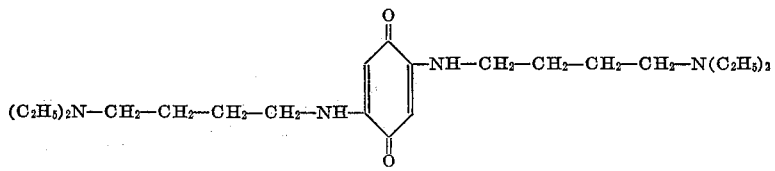

To 8.3 g. of 2-(4-diethylaminobutylamino)-p-benzoquinone in 100 ml. of dioxane there was added 6.3 g. (a 50% excess) of N,N-diethyl-1,4-butanediamine, and oxygen was passed into the mixture while keeping the temperature of the mixture at 35–40° C. for about thirty hours. The solution was then concentrated and the residue thus obtained was recrystallized from hot petroleum ether. There was obtained 4.5 g. of 2,5-bis-(4-diethylaminobutylamino)-p-benzoquinone, which melted at 105–16° C.

Analysis.—Calculated: N, 14.28%; C, 67.45%; H, 10.28. Found: N,14.12%; C, 67.69%; H, 10.41.

B. Quaternary salts of 2,5-bis-(4-diethylaminobutyl-amino)-p-benzoquinone 2,5 - bis - (4-diethylaminobutylamino)-p-benzoquinone was quaternized with two equivalents of methyl bromide to yield 2,5-bis-(4-diethylaminobutylamino)-p-benzoquinone bis-methobromide.

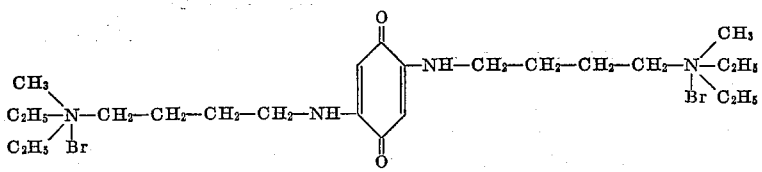

which melted at 229–230° C.

Analysis.—Calculated: N, 9.66%; Br, 27.55%. Found: N, 9.31%; Br, 27.65%.

The amine reacted with two molecular equivalents of benzyl chloride to yield 2,5-bis-(4-diethylaminobutyl-amino)-p-benzoquinone bis-(benzyl chloride), having the structural formula

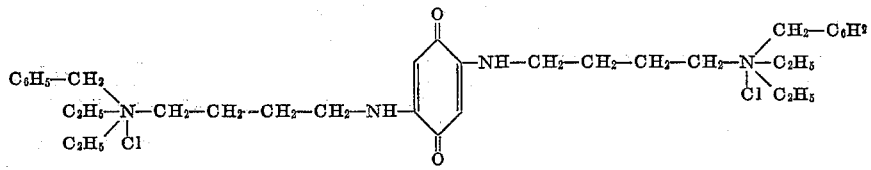

which was a red, amorphous compound having an indefinite melting point.

Similarly, the amine reacts with ethyl chloride to yield 2,5-bis-(4-diethylaminobutylamino)-p-benzoquinone bis-ethochloride, having the structural formula

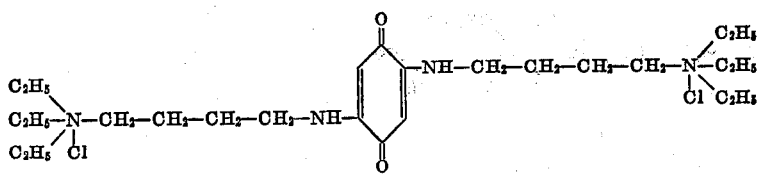

EXAMPLE 12

A. *2,5-bis-(5-diethylaminoamylamino)-p-benzoquinone*

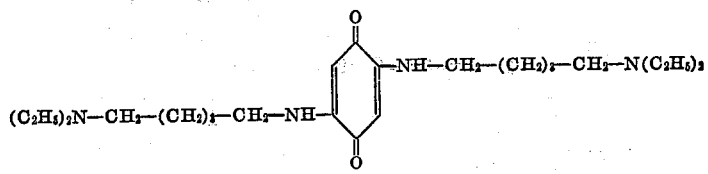

24 g. of N,N-diethyl-1,5-pentanediamine was added with cooling to 15 g. of p-benzoquinone in 150 ml. of dioxane. Oxygen was passed into the slightly warm solution for twenty hours. The reaction mixture was then concentrated under reduced pressure to a thick slush which was filtered. The collected solid was dissolved in ethanol, and water was added to the alcoholic solution, thereby causing the separation of a dark red oil which crystallized on standing. The crystalline solid which weighed 4.9 g., was 2,5-bis-(5-diethylaminoamylamino)-p-benzoquinone. It melted at 92–95° C.

*Analysis.*—Calculated: N, 13.32%. Found: N, 12.96%.

B. *Quaternary salts of 2,5-bis-(5-diethylaminoamylamino)-p-benzoquinone*

2 g. of 2,5-bis-(5-diethylaminoamylamino)-p-benzoquinone was quaternized by treatment with methyl bromide in ethanolic solution, and ether was then added to the reaction mixture. The red oil which precipitated solidified on standing to yield 2.5 g. of 2,5-bis-(5-diethylaminoamylamino)-p-benzoquinone bis-methobromide, having the formula

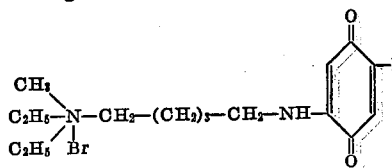

which melted at 112–113° C.

*Analysis.*—Calculated: N, 9.18%; Br, 26.19%. Found: N, 9.07%; Br, 25.68%.

The amine reacts with two molecular equivalents of methyl p-toluenesulfonate to yield 2,5-bis-(5-diethylamino amylamino)-p-benzoquinone bis-(methyl p-toluenesulfonate),

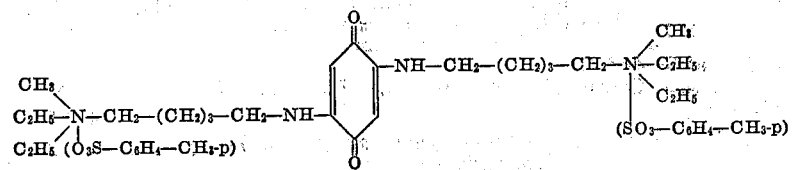

EXAMPLE 13

A. *2,5-bis-[5-(1-piperidyl)amylamino]-p-benzoquinone*

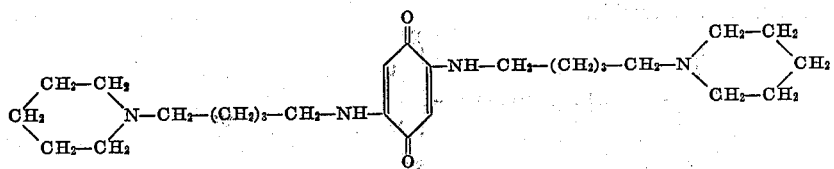

25 g. of 1-(5-aminoamyl)piperidine was added with cooling to a solution of 15 g. (an excess) of p-benzoquinone in 300 ml. of dioxane. The solution was warmed and oxygen was bubbled into the warm solution for twenty hours. The reaction mixture was concentrated under reduced pressure. The concentrated solution was cooled and the red crystalline solid which separated was collected on a filter. This solid was recrystallized from 95% ethanol to yield 9 g. of 2,5-bis-[5-(1-piperidyl)amylamino]-p-benzoquinone.

B. *Quaternary salts of 2,5-bis-[5-(1-piperidyl)amylamino]-p-benzoquinone*

2,5-bis-[5-(1-piperidyl)amylamino] - p - benzoquinone reacts with two equivalents of methyl bromide, to yield 2,5-bis-[5-(1-piperidyl)amylamino]-p-benzoquinone bismethobromide,

which melted at 264–270° C.

*Analysis.*—Calculated: N, 8.83%; Br, 25.19%. Found: N, 8.90%; Br, 25.25%.

The amine reacts with diethyl sulfate to yield 2,5-bis[5-(1-piperidyl)amylamino]-p-benzoquinone bis-(ethosulfate),

EXAMPLE 14

A. *2-(5-diethylaminoamylamino)-p-benzoquinone*

Employing a procedure similar to that described in part A of Example 2, one equivalent of N,N-diethyl-1,5-pentanediamine was reacted with p-benzoquinone under conditions of mild oxidation. There was thus obtained 2-(5-diethylaminoamylamino)-p-benzoquinone, which melted at 84–86° C.

*Analysis.*—Calculated: N, 10.60%. Found: N, 11.19%.

B. *Quaternary salts of 2-(5-diethylaminoamylamino)-p-benzoquinone*

2-(5-diethylaminoamylamino)-p-benzoquinone was quaternized by treatment with one equivalent of methyl bromide to yield 2-(5-diethylaminoamylamino)-p-benzoquinone methobromide, which had an indefinite melting point, ca. 113° C.

*Analysis.* — Calculated: N, 7.79%; Br, 22.22%. Found: N, 7.57%; Br, 22.92%.

The amine reacts with one equivalent of benzyl chloride to yield 2-(5-diethylaminoamylamino)-p-benzoquinone benzyl chloride,

EXAMPLE 15

A. *2-[5-(1-piperidyl)amylamino]-p-benzoquinone*

Using a procedure similar to that described in part A of Example 3, p-benzoquinone was reacted with one equivalent of 1-(5-aminoamyl)piperidine. After concentrating the reaction mixture, there was obtained as a product 2-[5-(1-piperidyl)amylamino]-p-benzoquinone, which melted at 176–177° C.

*Analysis.*—Calculated: N, 10.14%; C, 69.53%; H, 8.75%. Found: N, 9.98%; C, 69.63%; H, 8.97%.

This amine reacts with hydrobromic acid to yield the amine hydrobromide.

B. *Quaternary salts of 2-[5-(1-piperidyl)amylamino]-p-benzoquinone*

When 2-[5-(1-piperidyl)amylamino]-p-benzoquinone was quaternized by treatment with one equivalent of methyl bromide, there was obtained 2-[5-(1-piperidyl)amylamino]-p-benzoquinone methobromide, The amine reacts with allyl bromide to yield 2-[5-(1-piperidyl)amylamino]-p-benzoquinone allyl bromide

I claim:

1. A member of the class consisting of 2-[(tertiary amino)alkylamino]-p-benzoquinones having the formula where —N=B is a tertiary amino radical selected from the group consisting of di-(lower alkyl)amino radicals, 1-piperidyl radicals, and 1-pyrrolidyl radicals, Y' is a lower alkylene bridge interposing 3–5 carbon atoms between the two nitrogen atoms connected by the bridge, and $Z^2$ is a member of the group consisting of hydrogen, (lower alkyl)amino radicals, di-(lower alkyl) amino radicals, and (tertiary amino)alkylamino radicals having the formula —NH—Y'—N=B; and acid addition salts thereof.

2. A member of the class consisting of 2-[(tertiary amino)alkylamino]-p-benzoquinones having the formula where —N=B is a di-(lower alkyl)amino radical and Y' is a lower alkylene bridge interposing 3–5 carbon atoms between the two nitrogen atoms connected by the bridge; and acid addition salts thereof.

3. A member of the class consisting of 2-[(tertiary amino)alkylamino]-p-benzoquinones having the formula where —N=B is a 1-piperidyl radical, and Y' is a lower alkylene bridge interposing 3–5 carbon atoms between the two nitrogen atoms connected by the bridge; and acid addition salts thereof.

4. A member of the class consisting of 2,5-bis-[(tertiary amino)alkylamino]-p-benzoquinones having the formula

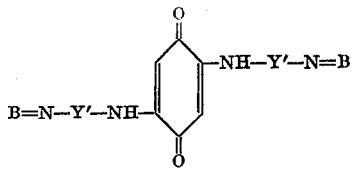

where N=B is a di-(lower alkyl)amino radical; Y' is a lower alkylene bridge interposing 3–5 carbon atoms between the two nitrogen atoms connected by the bridge; and acid addition salts thereof.

5. A member of the class consisting of 2,5-bis-[(tertiary amino)alkylamino]-p-benzoquinones having the formula

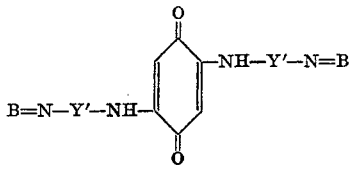

where N=B is a 1-piperidyl radical; Y' is a lower alkylene bridge interposing 3–5 carbon atoms between the two nitrogen atoms connected by the bridge; and acid addition salts thereof.

6. A member of the class consisting of 2,5-bis-(3-diethylaminopropylamino) - p - benzoquinone, having the structural formula

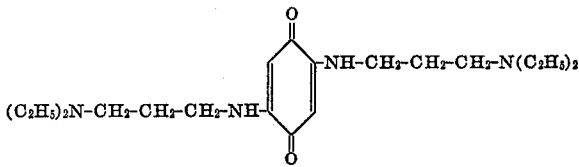

and acid addition salts thereof.

7. A member of the class consisting of 2,5-bis-(3-dimethylaminopropylamino)-p-benzoquinone, having the structural formula

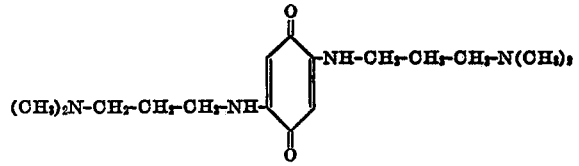

and acid addition salts thereof.

8. A member of the class consisting of 2,5-bis-(5-diethylaminoamylamino)-p-benzoquinone, having the structural formula

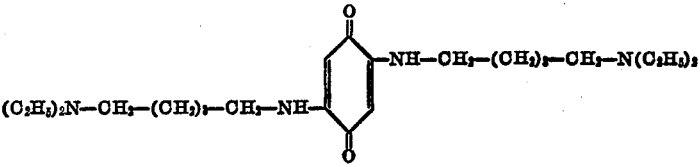

and acid addition salts thereof.

9. The process for preparing a 2-[(tertiary amino)alkylamino]-p-benzoquinone having the formula

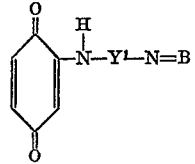

where $Y^1$ is a lower alkylene bridge interposing 3–5 carbon atoms between the two nitrogen atoms connected by the bridge, and N=B is a tertiary amino radical selected from the group consisting of di-(lower alkyl)amino, 1-piperidyl, and 1-pyrrolidyl radicals, which comprises reacting p-benzoquinone with one molecular equivalent of an amine having the formula $H_2N$—$Y^1$—N=B under conditions of mild oxidation.

10. The process for preparing a 2-[(tertiary amino)alkylamino]-5-$Z^2$-p-benzoquinone having the formula

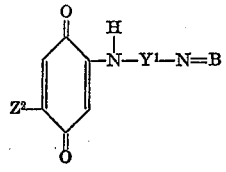

where $Y^1$ is a lower alkylene bridge interposing 3–5 carbon atoms between the two nitrogen atoms connected by the bridge, and N=B is a tertiary amino radical selected from the group consisting of di-(lower alkyl)amino, 1-piperidyl, and 1-pyrrolidyl radicals, and $Z^2$ is a member of the class consisting of (lower alkyl)amino, di-(lower alkyl)amino, and (tertiary amino)alkylamino radicals having the formula —NH—$Y^1$—N=B, which comprises reacting a 2-[(tertiary amino)alkylamino]-p-benzoquinone having the formula

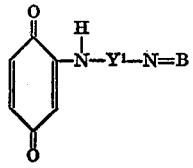

under conditions of mild oxidation with one molecular equivalent of an amine selected from the class consisting of (lower alkyl)amines having the formula (lower alkyl)-$NH_2$, di-(lower alkyl)amines having the formula (lower alkyl)$_2$NH, and (tertiary amino)alkylamines having the formula $H_2N$—$Y^1$—N=B.

References Cited in the file of this patent

P. B. 981, pp. 33–35 (1945).
Karrer, "Organic Chemistry," second ed., pp. 562–3 (1946).